(12) United States Patent
McCloud

(10) Patent No.: US 10,710,423 B2
(45) Date of Patent: Jul. 14, 2020

(54) JOINING A SUSPENSION ASSEMBLY TO A COMPOSITE TRAILER STRUCTURE

(71) Applicant: Wabash National, L.P., Lafayette, IN (US)

(72) Inventor: Travis Smith McCloud, Cadiz, KY (US)

(73) Assignee: Wabash National, L.P., Lafayette, IN (US)

( * ) Notice: Subject to any disclaimer, the term of this patent is extended or adjusted under 35 U.S.C. 154(b) by 147 days.

(21) Appl. No.: 15/758,338

(22) PCT Filed: Sep. 7, 2016

(86) PCT No.: PCT/US2016/050510
§ 371 (c)(1),
(2) Date: Mar. 7, 2018

(87) PCT Pub. No.: WO2017/044463
PCT Pub. Date: Mar. 16, 2017

(65) Prior Publication Data
US 2018/0264904 A1 Sep. 20, 2018

Related U.S. Application Data

(60) Provisional application No. 62/215,660, filed on Sep. 8, 2015.

(51) Int. Cl.
*B60G 11/28* (2006.01)
*B60G 9/00* (2006.01)
(Continued)

(52) U.S. Cl.
CPC .............. *B60G 11/28* (2013.01); *B60G 9/003* (2013.01); *B62D 21/20* (2013.01); *B62D 33/02* (2013.01);
(Continued)

(58) Field of Classification Search
CPC .... B60G 11/28; B60G 9/003; B62D 25/2054; B62D 21/20; B62D 33/02
See application file for complete search history.

(56) References Cited

U.S. PATENT DOCUMENTS

| 3,557,992 A | 1/1971 | Reeves |
| 3,637,252 A | 1/1972 | Metsker |

(Continued)

FOREIGN PATENT DOCUMENTS

| AU | 713260 | 11/1999 |
| CA | 1329818 | 5/1994 |

(Continued)

OTHER PUBLICATIONS

Black Sara "Structural adhesives Part I: Industrial" CompositesWorld posted Apr. 11, 2016 7 pages.

(Continued)

*Primary Examiner* — Faye M Fleming
(74) *Attorney, Agent, or Firm* — Faegre Dinker Biddle & Reath LLP

(57) ABSTRACT

A cargo vehicle includes a composite floor assembly configured to support cargo, at least one wheel assembly configured to transport the cargo on the composite floor assembly, a suspension assembly associated with the at least one wheel assembly, and an intermediate adapter assembly. The intermediate adapter assembly is permanently coupled to the composite floor assembly and removably coupled to the suspension assembly such that the composite floor assembly is removably coupled to the suspension assembly.

16 Claims, 10 Drawing Sheets

(51) Int. Cl.
 *B62D 21/20* (2006.01)
 *B62D 33/02* (2006.01)
(52) U.S. Cl.
 CPC .... *B60G 2200/31* (2013.01); *B60G 2202/152* (2013.01); *B60G 2204/4302* (2013.01); *B60G 2204/61* (2013.01); *B60G 2206/60* (2013.01); *B60G 2206/604* (2013.01); *B60G 2206/7101* (2013.01); *B60G 2300/042* (2013.01); *B60G 2300/40* (2013.01)

(56) References Cited

U.S. PATENT DOCUMENTS

| | | | |
|---|---|---|---|
| 4,418,507 A | 12/1983 | Roberts et al. | |
| 4,685,720 A | 8/1987 | Oren | |
| 4,758,299 A | 7/1988 | Burke | |
| 4,976,490 A | 12/1990 | Gentle | |
| 5,351,990 A | 10/1994 | Thomas | |
| 5,403,063 A | 4/1995 | Sjostedt et al. | |
| 5,429,066 A | 7/1995 | Lewit et al. | |
| 5,507,405 A | 4/1996 | Thomas | |
| 5,562,981 A | 10/1996 | Ehrlich | |
| 5,566,971 A | 10/1996 | Perlot | |
| 5,664,518 A | 9/1997 | Lewit et al. | |
| 5,700,118 A | 12/1997 | Bennett | |
| 5,765,639 A | 6/1998 | Muth | |
| 5,772,276 A | 6/1998 | Fetz et al. | |
| 5,800,749 A | 9/1998 | Lewit et al. | |
| 5,802,984 A | 9/1998 | Thoman | |
| 5,830,308 A | 11/1998 | Reichard | |
| 5,860,668 A | 1/1999 | Hull et al. | |
| 5,860,693 A | 1/1999 | Ehrlich | |
| 5,890,435 A | 4/1999 | Thoman | |
| 5,897,818 A | 4/1999 | Lewit et al. | |
| 5,908,591 A | 6/1999 | Lewit et al. | |
| 5,916,093 A | 6/1999 | Fecko | |
| 5,979,684 A | 11/1999 | Ohnishi | |
| 5,992,117 A | 11/1999 | Schmidt | |
| 6,004,492 A | 12/1999 | Lewit et al. | |
| 6,013,213 A | 1/2000 | Lewit et al. | |
| 6,076,693 A | 6/2000 | Reiter | |
| 6,082,810 A | 7/2000 | Bennett | |
| 6,092,472 A | 7/2000 | Thoman | |
| 6,199,939 B1 | 3/2001 | Ehrlich | |
| 6,206,669 B1 | 3/2001 | Lewit et al. | |
| 6,220,651 B1 | 4/2001 | Ehrlich | |
| 6,227,125 B1 | 5/2001 | Schroeder | |
| 6,247,747 B1 | 6/2001 | Kawanomoto | |
| 6,318,794 B1 | 11/2001 | Berube | |
| 6,349,988 B1 | 2/2002 | Foster | |
| 6,374,546 B1 | 4/2002 | Fecko | |
| 6,496,190 B1 | 12/2002 | Driemeyher et al. | |
| 6,497,190 B1 | 12/2002 | Lewit | |
| 6,505,883 B1 | 1/2003 | Ehrlich | |
| 6,543,469 B2 | 4/2003 | Lewit et al. | |
| 6,615,741 B2 | 9/2003 | Fecko | |
| 6,626,622 B2 | 9/2003 | Zubko | |
| 6,688,835 B1 | 2/2004 | Buher | |
| 6,723,273 B2 | 4/2004 | Johnson et al. | |
| 6,740,381 B2 | 5/2004 | Day et al. | |
| 6,745,470 B2 | 6/2004 | Foster et al. | |
| 6,755,998 B1 | 6/2004 | Reichard et al. | |
| 6,761,840 B2 | 7/2004 | Fecko | |
| 6,824,341 B2 | 11/2004 | Ehrlich | |
| 6,834,873 B1 | 12/2004 | Vander Kooi et al. | |
| 6,843,525 B2 | 1/2005 | Preisler | |
| 6,854,791 B1 | 2/2005 | Jaggi | |
| 6,863,339 B2 | 3/2005 | Bohm | |
| 6,869,561 B2 | 3/2005 | Johnson et al. | |
| 6,877,940 B2 | 4/2005 | Nelson | |
| 6,893,075 B2 | 5/2005 | Fenton et al. | |
| 6,911,252 B2 | 6/2005 | Lewit et al. | |
| 6,986,546 B2 | 1/2006 | Ehrlich | |
| 7,000,978 B1 | 2/2006 | Messano | |
| 7,025,166 B2 | 4/2006 | Thomas | |
| 7,025,408 B2 | 4/2006 | Jones et al. | |
| 7,069,702 B2 | 7/2006 | Ehrlich | |
| 7,134,820 B2 | 11/2006 | Ehrlich | |
| 7,182,396 B2 | 2/2007 | Taylor | |
| 7,219,952 B2 | 5/2007 | Taylor | |
| 7,264,305 B2 | 9/2007 | Kuriakose | |
| 7,353,960 B2 | 4/2008 | Seiter | |
| 7,407,216 B2 | 8/2008 | Taylor | |
| 7,434,520 B2 | 10/2008 | Zupancich | |
| 7,451,995 B2 | 11/2008 | Bloodworth et al. | |
| 7,461,888 B2 | 12/2008 | Brown | |
| 7,517,005 B2 | 4/2009 | Kuriakose | |
| 7,575,264 B1 | 8/2009 | Solomon | |
| 7,578,534 B2 | 8/2009 | Wuerfel, III | |
| 7,578,541 B2 | 8/2009 | Layfield | |
| 7,587,984 B2 | 9/2009 | Zupancich | |
| 7,588,286 B2 | 9/2009 | Lewallen | |
| 7,594,474 B2 | 9/2009 | Zupancich | |
| 7,608,313 B2 | 10/2009 | Solomon | |
| 7,621,589 B1 | 11/2009 | Gerome | |
| 7,704,026 B2 | 4/2010 | Roush | |
| 7,722,112 B2 | 5/2010 | Ehrlich | |
| 7,748,172 B2 | 7/2010 | Zupancich | |
| 7,762,618 B2 | 7/2010 | Lewallen | |
| 7,790,076 B2 | 9/2010 | Seiter | |
| 7,829,165 B2 | 11/2010 | Grandominico et al. | |
| 7,887,120 B2 | 2/2011 | Boivin | |
| 7,901,537 B2 | 3/2011 | Jones | |
| 7,905,072 B2 | 3/2011 | Verhaeghe | |
| 7,914,034 B2 | 3/2011 | Roush | |
| 7,931,328 B2 | 4/2011 | Lewallen | |
| 8,016,322 B2 | 9/2011 | Keehan | |
| 8,056,960 B2 | 11/2011 | Brown | |
| 8,186,747 B2 | 5/2012 | Bloodworth et al. | |
| 8,263,217 B2 | 9/2012 | Verhaeghe | |
| 8,342,588 B2 | 1/2013 | Skaradzinski | |
| 8,448,989 B2 | 5/2013 | Verhaeghe | |
| 8,474,171 B1 | 7/2013 | Ludwick | |
| 8,696,048 B2 | 4/2014 | Griffin et al. | |
| 8,757,704 B2 | 6/2014 | Zhao et al. | |
| 8,814,255 B2 | 8/2014 | Yamaji et al. | |
| 8,876,193 B2 | 11/2014 | Kunkel et al. | |
| 8,950,144 B2 | 2/2015 | Padmanabhan | |
| 9,051,014 B2 | 6/2015 | Lookebill et al. | |
| 9,138,943 B2 | 9/2015 | Weinberg | |
| 9,138,974 B2 | 9/2015 | Weinberg | |
| 9,138,975 B2 | 9/2015 | Weinberg | |
| 9,174,656 B2 | 11/2015 | Heitmeyer | |
| 9,199,440 B2 | 12/2015 | Weinberg | |
| 9,205,635 B2 | 12/2015 | Weinberg | |
| 9,260,117 B2 | 2/2016 | Vande Sands | |
| 9,339,987 B2 | 5/2016 | Weinberg | |
| 9,371,468 B2 | 6/2016 | Lewit | |
| 9,409,607 B2 | 8/2016 | Osten | |
| 9,434,421 B1 | 9/2016 | Lu | |
| 9,499,203 B1* | 11/2016 | Finley | B62D 21/10 |
| 9,566,769 B2 | 2/2017 | Weinberg | |
| 9,604,677 B2 | 3/2017 | McKinney | |
| 9,650,003 B2 | 5/2017 | Owens | |
| 9,708,009 B2 | 7/2017 | Vance | |
| 9,738,050 B2 | 8/2017 | Lee | |
| 9,744,753 B2 | 8/2017 | Sheffield | |
| 9,815,501 B2 | 11/2017 | McCormack | |
| 9,827,750 B2 | 11/2017 | Lookebill | |
| 9,828,164 B2 | 11/2017 | Denson | |
| 9,878,744 B2 | 1/2018 | Lu | |
| 9,884,660 B2 | 2/2018 | Fenton | |
| 9,884,661 B2 | 2/2018 | Fenton | |
| 9,889,637 B2 | 2/2018 | Weinberg | |
| 2001/0011832 A1 | 8/2001 | Ehrlich | |
| 2004/0119276 A1* | 6/2004 | Fior | B62D 21/10 280/781 |
| 2005/0194381 A1 | 9/2005 | Zupancich | |
| 2005/0241253 A1 | 11/2005 | Song et al. | |
| 2006/0065152 A1 | 3/2006 | Heitmeyer | |
| 2006/0108361 A1 | 5/2006 | Seiter | |
| 2006/0121244 A1 | 6/2006 | Godwin | |
| 2006/0123725 A1 | 6/2006 | Godwin | |
| 2006/0158005 A1 | 7/2006 | Brown | |

(56) References Cited

U.S. PATENT DOCUMENTS

| | | |
|---|---|---|
| 2006/0179733 A1 | 8/2006 | Padmanabhan |
| 2006/0201081 A1 | 9/2006 | Godwin |
| 2006/0219129 A1 | 10/2006 | Jarvis |
| 2007/0119850 A1 | 5/2007 | Seiter |
| 2007/0132278 A1 | 6/2007 | Lester et al. |
| 2007/0160793 A1 | 7/2007 | Cageao |
| 2007/0194602 A1 | 8/2007 | Ehrlich |
| 2007/0216197 A1 | 9/2007 | Wuerfel, III |
| 2007/0250025 A1 | 10/2007 | Sams |
| 2008/0290057 A1 | 11/2008 | Zupancich |
| 2009/0126600 A1 | 5/2009 | Zupancich |
| 2009/0278386 A1 | 11/2009 | Ehrlich |
| 2010/0019536 A1 | 1/2010 | Bloodworth et al. |
| 2010/0101876 A1 | 4/2010 | Misencik |
| 2010/0109309 A1 | 5/2010 | Kootstra |
| 2011/0095574 A1 | 4/2011 | Brown |
| 2011/0204611 A1 | 8/2011 | Ziegler |
| 2012/0313342 A1 | 12/2012 | Ramsey |
| 2013/0207413 A1 | 8/2013 | Lookebill et al. |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |
| 2015/0076861 A1 | 3/2015 | Padmanabhan |
| 2015/0137560 A1 | 5/2015 | Presiler |
| 2015/0158532 A1 | 6/2015 | Ayuzawa |
| 2015/0203160 A1 | 7/2015 | Peterson et al. |
| 2017/0057561 A1 | 3/2017 | Fenton |
| 2017/0166263 A1 | 6/2017 | McKinney |
| 2017/0210317 A1 | 7/2017 | Owens |
| 2017/0240216 A1 | 8/2017 | Bauer |
| 2017/0240217 A1 | 8/2017 | Storz |
| 2017/0241134 A1 | 8/2017 | McCloud |
| 2017/0247063 A1 | 8/2017 | Banerjee |
| 2017/0282499 A1 | 10/2017 | LaRocco |
| 2017/0334489 A1 | 11/2017 | Shin |
| 2018/0037151 A1 | 2/2018 | Bauer et al. |
| 2018/0319451 A1* | 11/2018 | Smith .................... B62D 61/12 |

FOREIGN PATENT DOCUMENTS

| | | |
|---|---|---|
| CA | 2181750 | 1/1997 |
| CA | 2199584 | 9/1997 |
| CA | 2253308 | 11/1997 |
| CA | 2551863 | 3/1998 |
| CA | 2219312 | 4/1998 |
| CA | 2242467 | 7/1999 |
| CA | 2261384 | 8/1999 |
| CA | 2265405 | 1/2000 |
| CA | 2275848 | 12/2000 |
| CA | 2382578 | 3/2001 |
| CA | 2455957 | 5/2004 |
| CA | 2768878 | 3/2005 |
| CA | 2811134 | 4/2006 |
| CA | 2529762 | 6/2006 |
| CA | 2650992 | 11/2006 |
| CA | 2528558 | 5/2007 |
| CA | 2565510 | 8/2007 |
| CA | 2604282 | 3/2008 |
| CA | 2689745 | 7/2009 |
| CA | 2689746 | 7/2009 |
| CA | 2689747 | 7/2009 |
| CA | 2689748 | 7/2009 |
| CA | 2689749 | 7/2009 |
| CA | 2689751 | 7/2009 |
| CA | 2797778 | 7/2009 |
| CA | 2802907 | 7/2009 |
| CA | 2788047 | 8/2011 |
| CA | 2763094 | 7/2012 |
| CA | 2848174 | 10/2014 |
| CA | 2894059 | 12/2015 |
| CA | 2807710 | 5/2016 |
| CA | 2977131 | 9/2016 |
| CA | 2958805 | 8/2017 |
| CA | 2958838 | 8/2017 |
| CA | 2958839 | 8/2017 |
| CN | 204279630 U | 4/2015 |
| DE | 2617169 | 10/2013 |
| EP | 2660119 | 6/2013 |
| JP | 06293233 | 10/1994 |

OTHER PUBLICATIONS

CMS North America Inc. "Transportation: Refrigerated Semi-trailers Trailers & Vans" available online at http:www.cmsna.com13_transportation_refrigerated_semi_trailers_trailers_vans.php on or before Jul. 2, 2014 2 pages.

North American Composites Virtual Engineered Composites (VEC) Article available online at http:www.nacomposites.comdelivering-performancepage.asp?issueid=7&page=cover Fall 2006 4 pages.

Reichard Dr. Ronnal P. "Composites in Theme Parks: From the perspective of a contractor-trouble shooter-enthusiast!" presented at Florida Institute of Technology at least as early as 1999 37 pages.

Lightweight Structures B.V. "ColdFeather: lightweight composite isothermal trailer" available online at http:www.lightweight-structures.comcoldfeather-lightweight-composite-isothermal-trailerindex.html at least as early as Jun. 18, 2015 6 pages.

Expedition Portal "Truck Camper Construction Costs?" available online at http:www.expeditionportal.comforumthreads12486-Truck-Camper-Construction-Costs at least as early as Jun. 18, 2015 5 pages.

Griffiths Bob "Rudder Gets New Twist with Composites" CompositesWorld posted Aug. 1, 2006 4 pages.

Morey Bruce "Advanced Technologies Supplement: Processes Reduce Composite Costs" Advanced Manufacturing posted Apr. 1, 2007 7 pages.

NetCompositesNow.com "Twisted Composites Rudders" available online at http:www.netcomposites.comnewstwisted-composites-rudders3202 as early as Aug. 11, 2005 3 pages.

Eric Green Associates.com "Composite Rudders Take Shape for U.S. Navy" available online at http:www.ericgreeneassociates.comimagesComposite_Twisted_Rudder.pdf accessed as early as Jul. 13, 2014 7 pages.

Seaver Mark and Trickey Stephen "Underwater Blast Loading of a Composite Twisted Rudder with FBGS" dated Apr. 14, 2008 19th International Conference on Optical Fibre Sensors 2 pages.

Scott Bader Group Companies Crystic "Composites Handbook" 100 pages.

Kedward Keith and Whitney James Delaware Composites Design Encyclopedia "Design Studies" vol. 5 1990 preview version available at https:books.google.combooks?id=9-KYOm81MWEC&printsec=frontcover#v=onepage&q&f=false 17 pages.

Zweben Carl Handbook of Materials Selection "Chapter 12: Composite Materials" 2002 preview version available at https:books.google.combooks?id=gWg-rchM700C&printsec=frontcover#v=onepage&q&f=false 47 pages.

Johnson Truck Bodies Blizzard Series brochure accessed as early as Aug. 1, 2014 8 pages.

International Trucking Shows "True Composites Platform Highlight of International Trucking Show" Aug. 1992 1 page.

Composite Twisted Rudder TCC Meeting 2008 handout 32 pages.

Composite Marine Control Surface installed on USS Pioneer (MCM 9) May 1997 13 pages.

TrailerBody Builders "More Emphasis on Less Weight" available at http:trailer-bodybuilders.comtrailersmore-emphasis-less-weight May 1, 2008 5 pages.

International Search Report and Written Opinion issued by the ISA/US, Commissioner for Patents, dated Dec. 12, 2016, for International Application No. PCT/US2016/050510; 10 pages.

International Preliminary Report on Patentability issued by the IPEA/US, Commissioner for Patents, dated Jan. 3, 2018, for International Application No. PCT/US2016/050510; 6 pages.

* cited by examiner

JOINING A SUSPENSION ASSEMBLY TO A COMPOSITE TRAILER STRUCTURE

CROSS REFERENCE TO RELATED APPLICATIONS

This application is a U.S. National Stage Application of International Patent Application No. PCT/US2016/050510, filed Sep. 7, 2016, which claims priority to U.S. Provisional Patent Application Ser. No. 62/215,660, filed Sep. 8, 2015, the complete disclosures each of which is expressly incorporated by reference herein in its entirety.

FIELD OF THE DISCLOSURE

The present disclosure relates generally to joining a suspension assembly to a composite cargo vehicle structure, such as a trailer structure and, more particularly, to joining a suspension assembly to a composite floor assembly of a trailer.

BACKGROUND OF THE DISCLOSURE

A trailer or another cargo vehicle which supports and transports cargo may include composite structures formed from various metallic and/or polymeric materials. Due to the configuration of composite structures, coupling another component of the trailer to the composite structure by forming holes in the composite structure for mechanical fasteners (e.g., bolts, rivets) may damage a portion of the composite structure. For example, the fibers in and around the holes of the composite structure may be damaged by the tool used to form the holes and/or by the fasteners placed in the holes. Therefore, a need exists to join various components of a cargo vehicle to a composite structure of the cargo vehicle (e.g., a composite floor assembly) while preserving the structural integrity of the composite structure.

SUMMARY OF THE DISCLOSURE

According to an exemplary embodiment of the present disclosure, a cargo vehicle is provided including a composite floor assembly configured to support cargo, at least one wheel assembly configured to transport the cargo on the composite floor assembly, a suspension assembly associated with the at least one wheel assembly, and an intermediate adapter assembly permanently coupled to the composite floor assembly and removably coupled to the suspension assembly.

According to another exemplary embodiment of the present disclosure, a cargo vehicle is provided including a composite floor assembly configured to support cargo, the composite floor assembly including a left longitudinal support beam and a right longitudinal support beam, at least one wheel assembly configured to transport the cargo on the composite floor assembly, a suspension assembly associated with the at least one wheel assembly, and an adapter assembly positioned between the composite floor assembly and the suspension assembly, the adapter assembly defining a left channel that receives the left longitudinal support beam of the composite floor assembly and a right channel that receives the right longitudinal support beam of the composite floor assembly.

According to yet another exemplary embodiment of the present disclosure, a method is provided for joining a suspension assembly of a cargo vehicle to a composite floor assembly of the cargo vehicle. The method includes the steps of: providing an intermediate adapter assembly; permanently coupling the adapter assembly to the composite floor assembly; and removably coupling the adapter assembly to the suspension assembly.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
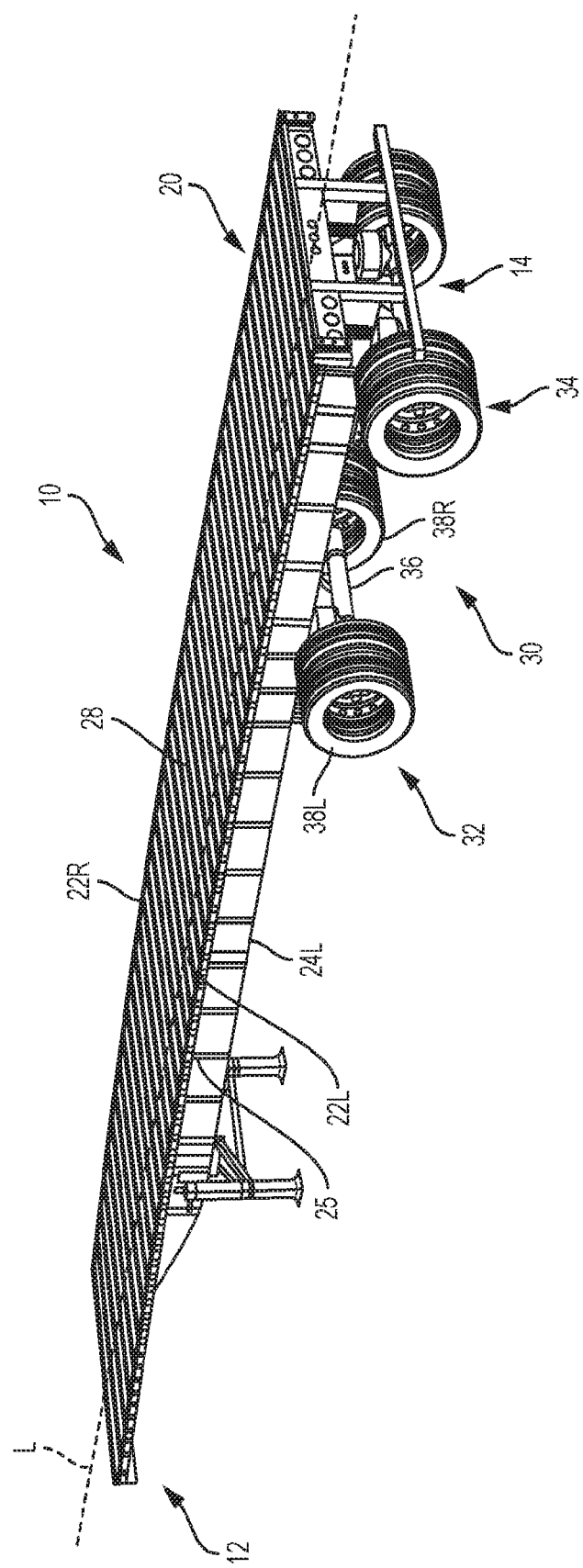
FIG. 1 is a top perspective view of a flatbed trailer.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Figure 2:
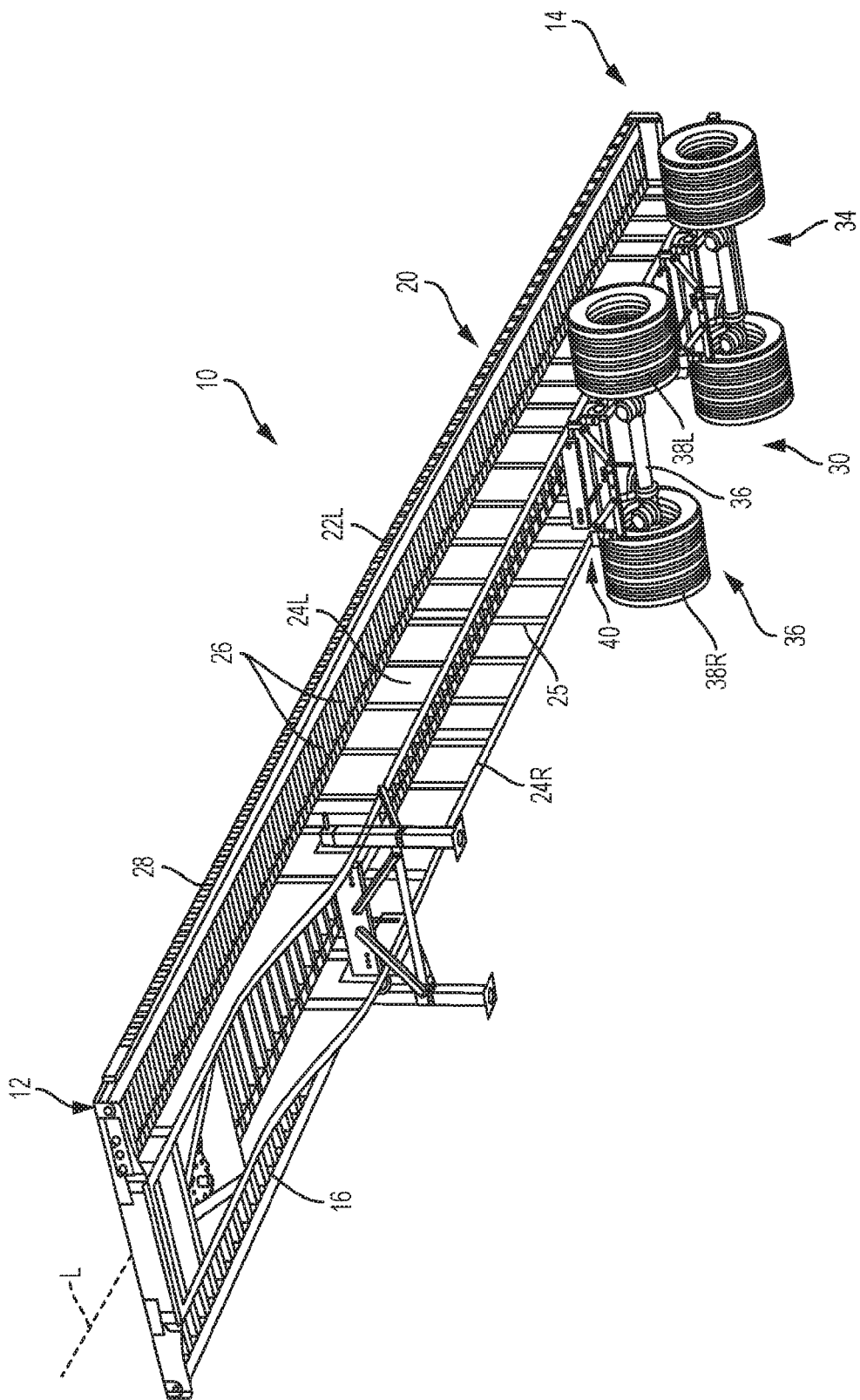
FIG. 2 is a bottom perspective view of the flatbed trailer of FIG. 1, the flatbed trailer including a floor assembly, a suspension assembly, and an intermediate adapter assembly between the floor assembly and the suspension assembly.

A flatbed trailer 10 of a cargo vehicle is shown in FIGS. 1 and 2 for supporting and transporting cargo. While the concepts of this disclosure are described in relation to a flatbed trailer, it will be understood that they are equally applicable to other vehicles generally, and more specifically to other trailers (e.g., dry freight semi trailers, refrigerated semi trailers), conventional truck and/or box or van type trailers (e.g., dry vans, refrigerated vans), examples of which include, but are not limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

The illustrative trailer 10 of FIGS. 1 and 2 extends along a longitudinal axis L from a front end 12 to a rear end 14. At the front end 12, trailer 10 includes a kingpin 16, as shown in FIG. 2, configured to couple trailer 10 to a tractor (not shown) for towing trailer 10. Between the front end 12 and the rear end 14, trailer 10 includes a floor assembly 20 configured to support cargo. At the rear end 14, trailer 10 includes a tandem wheel assembly 30. The floor assembly 20 and the tandem wheel assembly 30 of trailer 10 are described further below.

Referring still to FIGS. 1 and 2, the floor assembly 20 of trailer 10 includes a left side rail 22L and a right side rail 22R extending parallel to the longitudinal axis L. Between each side rail 22L, 22R and the longitudinal axis L, the floor assembly 20 includes a left longitudinal support beam 24L and a right longitudinal support beam 24R extending parallel to the longitudinal axis L. Each longitudinal support beam 24L, 24R may include one or more stiffening ribs 25 for added strength. The stiffening ribs 25 may be provided on the inner and/or outer surfaces of each longitudinal support beam 24L, 24R. The illustrative stiffening ribs 25 extend vertically, but it is also within the scope of the present disclosure for the stiffening ribs 25 to extend horizontally or in another suitable direction. The floor assembly 20 also includes a plurality of cross-beams 26 extending transversely to the longitudinal axis L. The longitudinal support beams 24L, 24R and cross-beams 26 of the floor assembly 20 support an upper surface or platform 28 and any cargo thereon. In certain embodiments, the platform 28 is cooperatively formed by a plurality of floor planks extending along the longitudinal axis L and across the cross-beams 26. The individual components of the floor assembly 20 may be assembled together through welding, bonding (e.g., adhesive), molding, or with mechanical fasteners (e.g., bolts, rivets), for example.

2. Composite Materials

The floor assembly 20 of trailer 10 may be a composite structure (i.e., a structure constructed of composite materials), in whole or in part. As such, the floor assembly 20 may be referred to herein as a composite floor assembly 20. For example, the longitudinal support beams 24L, 24R, crossbeams 26, and/or platform 28 of the floor assembly 20 may be composite structures. In an exemplary embodiment, at least the longitudinal support beams 24L, 24R of the floor assembly 20 are composite structures. These composite structures may lack internal metal components. Also, each composite structure may be a single, unitary component, which may be formed from a plurality of layers permanently coupled together. Other elements of trailer 10 may be constructed of non-composite (e.g., metallic) materials. For example, the kingpin 16 and the side rails 22L, 22R, of trailer 10 may be constructed of metallic materials.

The composite construction of floor assembly 20 may present certain advantages. First, because the composite structures may lack internal metal components, the composite floor assembly 20 may have a reduced heat loss coefficient (Ua) and improved thermal efficiency. Also, the composite floor assembly 20 may operate to minimize outgassing of blowing agents, minimize air loss, and minimize water intrusion. Additionally, the composite floor assembly 20 may be lighter in weight than a typical metallic cargo body, which may improve fuel efficiency. Further, the composite floor assembly 20 may have fewer metallic structures than a typical cargo body, which may make the cargo body 130 less susceptible to corrosion. Also, the composite floor assembly 20 may include fewer parts than a typical metallic cargo body, which may simplify construction, reduce inventory, and reduce variation in manufacturing. Further, the composite floor assembly 20 may be suitable for use with sensitive cargo, including foodstuffs, because the composite materials may be inert to avoid reacting with the cargo and other materials and because the composite materials may be easy to clean and maintain to ensure proper hygiene. As a result, the composite floor assembly 20 may qualify as "food grade" equipment.

Composite materials are generally formed by combining two or more different constituents that remain separate and distinct in the final composite material. Exemplary composite materials may include fiber-reinforced plastics (FRP), for example carbon-fiber-reinforced plastics (CRP). Such materials may be formed from an extruded preform assembly of a woven or stitched fiberglass cloth, a non-woven spun bond polymeric material, and a foam core (not shown). These preforms may be cut to size, combined in a mold resembling the final shape with other fiberglass and resin layers, and wetted with at least one resin and optionally a catalyst to define a single structure during a curing process. The spun bond polymeric material may be mechanically stitched to the fiberglass cloth and/or the foam before the preforms are wetted with resin. In one embodiment, the spun bond material may be a polyester material, the foam may be a polyurethane material, and the resin may be a thermoset plastic resin matrix. An exemplary resin is the co-cure resin disclosed in U.S. Pat. No. 9,371,468, which is incorporated by reference in its entirety herein.

The individual preforms may be sized, shaped, and arranged in a manner that accommodates the strength requirements of the final structure. In areas of the final structure requiring less strength, the preforms may be relatively large in size, with the foam cores spanning relatively large distances before reaching the surrounding fiberglass and polymeric skins. By contrast, in areas of the final structure requiring more strength, the preforms may be relatively small in size, with the foam cores spanning relatively small distances before reaching the surrounding fiberglass and polymeric skins. For example, the preforms may be shaped as relatively wide panels in areas of the final structure requiring less strength and as relatively narrow support beams in areas of the final structure requiring more strength. Other exemplary techniques for strengthening such support beams include reinforcing the outer skins, such as by using uni-directional glass fibers or additional cloth in the outer skins, and/or reinforcing the inner cores, such as by using hard plastic blocks or higher density foam in the inner cores.

After the curing process, a coating may be applied to the inner and/or outer surfaces of the cured preforms. Additionally, metallic or non-metallic sheets or panels may be applied to the inner and/or outer surfaces of the cured preforms, either in place of the coating or with the coating. The metallic sheets or panels may be comprised of stainless steel, aluminum, and/or coated carbon steel, and the non-metallic sheets or panels may be comprised of carbon fiber composites, for example.

Exemplary composite structures include DuraPlate® structures provided by Wabash National Corporation of Lafayette, Ind. and PRISMA® structures provided by Compsys, Inc. of Melbourne, Fla. Such composite structures may be manufactured using technology disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, 6,543,469, and 9,371,468 and U.S. Patent Application Publication No. 2014/0262011.

3. Wheel and Suspension Assemblies

Referring still to FIGS. 1 and 2, the tandem wheel assembly 30 of trailer 10 includes a front wheel assembly 32 and a rear wheel assembly 34. Each wheel assembly 32, 34 includes an axle 36 supporting one or more left wheels 38L and one or more right wheels 38R.

Figure 3:
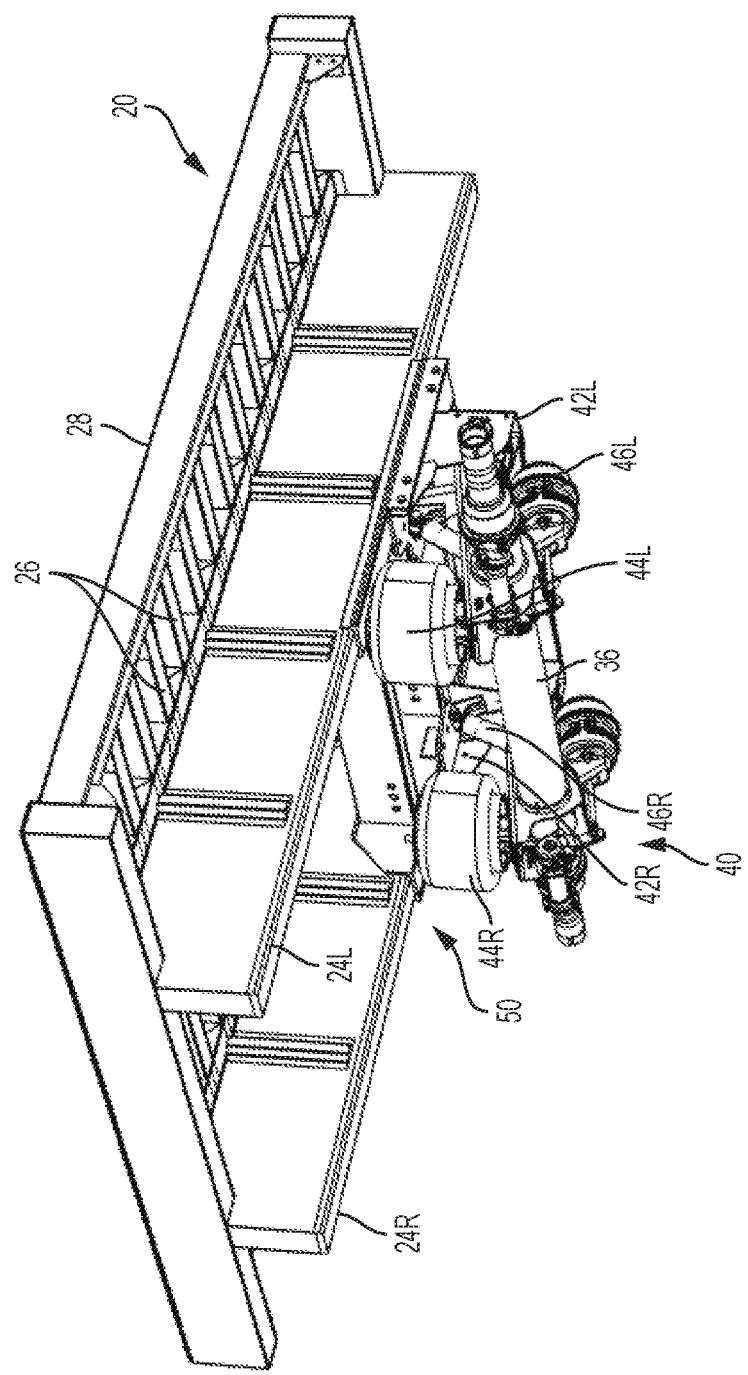
FIG. 3 is an assembled perspective view of the floor assembly, the suspension assembly, and the intermediate adapter assembly of FIG. 2.
Figure 4:
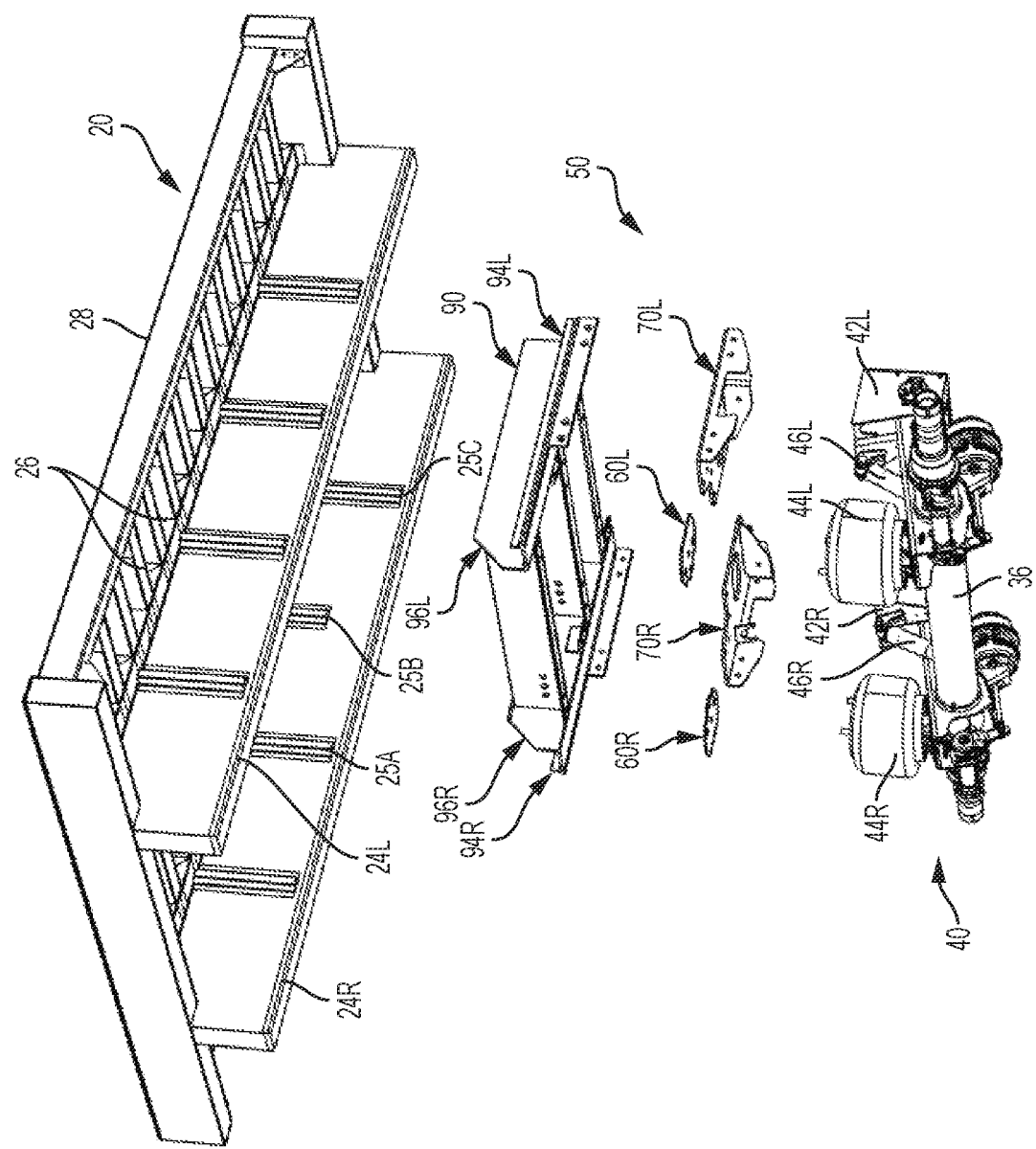
FIG. 4 is an exploded perspective view of the floor assembly, the suspension assembly, and the intermediate adapter assembly of FIG. 2, the intermediate adapter assembly including lower front frame members, lower rear frame members, and an upper frame member.

Referring next to FIGS. 3 and 4, trailer 10 further includes a fixed suspension assembly 40 associated with each wheel assembly 32, 34 (FIG. 2). An exemplary suspension assembly 40 is an air-type suspension assembly, as shown in FIGS. 3 and 4, but it is also within the scope of the present disclosure to use a spring-type suspension assembly or another suitable suspension assembly. The illustrative suspension assembly 40 includes pivoting frame assemblies 42L, 42R that span between the longitudinal support beams 24L, 24R of the floor assembly 20 and support the axle 36 of the corresponding wheel assembly 32, 34. Between the longitudinal support beams 24L, 24R and axle 36, the suspension assembly 40 includes corresponding air bags 44L, 44R and corresponding shock absorbers 46L, 46R, wherein the air bags 44L, 44R are illustratively positioned forward of the shock absorbers 46L, 46R. In operation, the air bags 44L, 44R may be filled to a desired air pressure to adjust the spacing and movement between the longitudinal support beams 24L, 24R and axle 36, while the shock absorbers 46L, 46R may dampen the movements of the pivoting frame assemblies 42L, 42R. Additional information regarding air-type suspension assemblies is disclosed in U.S. Pat. No. 5,536,036, the entire disclosure of which is expressly incorporated herein by reference.

As discussed above, the floor assembly 20, and specifically the longitudinal support beams 24L, 24R of the floor assembly 20, may be composite structures. Due to the configuration of composite structures, the composite support beams 24L, 24R may not be directly coupled to suspension assembly 40 with mechanical fasteners, because forming holes in the composite support beams 24L, 24R for direct insertion of mechanical fasteners (e.g., bolts, rivets) may damage the fibers of the composite material forming the composite support beams 24L, 24R.

To preserve the structural integrity of the composite support beams 24L, 24R, the composite floor assembly 20 may be coupled to the suspension assembly 40 through an intermediate adapter assembly 50, as shown in FIGS. 3 and 4. The adapter assembly 50 is permanently coupled to the composite floor assembly 20 and is removably coupled to the suspension assembly 40, which enables the composite floor assembly 20 to be removably coupled to the suspension assembly 40 through the adapter assembly 50. As used herein, components that are "removably coupled" together are capable of being repeatedly un-coupled without damage or destruction and then re-coupled together. In certain exemplary embodiments, components may be "removably coupled" together through mechanical fasteners (e.g., bolts). By contrast, components that are "permanently coupled" together require damage or destruction to the components themselves or the coupling mechanism in order to be un-coupled. In certain exemplary embodiments, components may be "permanently coupled" together through bonding (e.g., adhering) and/or molding, for example. In certain embodiments, the strength of the permanent coupling mechanism (e.g., adhesive) may exceed the strength of composite floor assembly 20 itself, so the composite floor assembly 20 may delaminate or otherwise fail before the adhesive fails.

The adapter assembly 50 may be constructed of a metallic or polymeric material, for example aluminum, titanium, or steel. In one embodiment, the adapter assembly 50 is constructed of a metallic or polymeric material which is dissimilar from the composite materials used to construct the composite floor assembly 20.

As shown in FIG. 4, the illustrative adapter assembly 50 includes lower front frame members 60L, 60R, lower rear frame members 70L, 70R, and an upper frame member 90. The lower front frame members 60L, 60R of the adapter assembly 50 are associated with corresponding air bags 44L, 44R of the suspension assembly 40. The lower rear frame members 70L, 70R of the adapter assembly 50 are associated with corresponding pivoting frame assemblies 42L, 42R and shock absorbers 46L, 46R of the suspension assembly 40. The upper frame member 90 of the adapter assembly 50 is associated with the longitudinal support beams 24L, 24R of the floor assembly 20. The individual components of the adapter assembly 50 are described further below.

Figure 5:
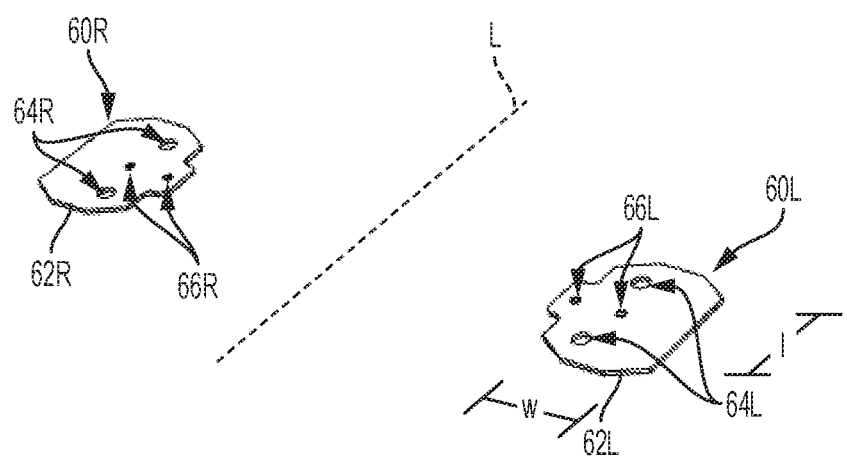
FIG. 5 is a top perspective view of the lower front frame members of FIG. 4.

The lower front frame members 60L, 60R of the adapter assembly 50 are described with reference to FIG. 5. The illustrative lower front frame members 60L, 60R are mirror images of one another about the longitudinal axis L. Each lower front frame member 60L, 60R includes a generally oval-shaped plate 62L, 62R with a plurality of vertically-extending locating holes 64L, 64R and a plurality of vertically-extending fastening holes 66L, 66R. In one embodiment, each plate 62L, 62R has a length, l, of approximately 4 to 15 inches and, more particularly, approximately 9 inches, and has a width, w, of approximately 4 to 15 inches and, more particularly, approximately 8 inches.

Figure 6:
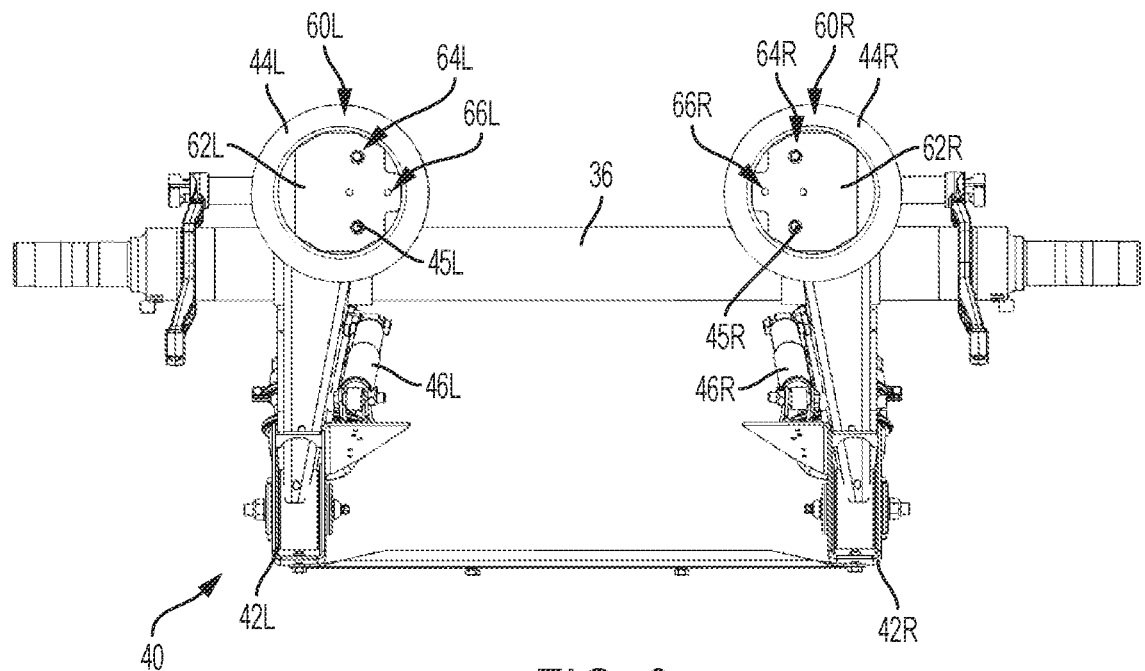
FIG. 6 is a top plan view of the lower front frame members assembled to the suspension assembly.
Figure 7:
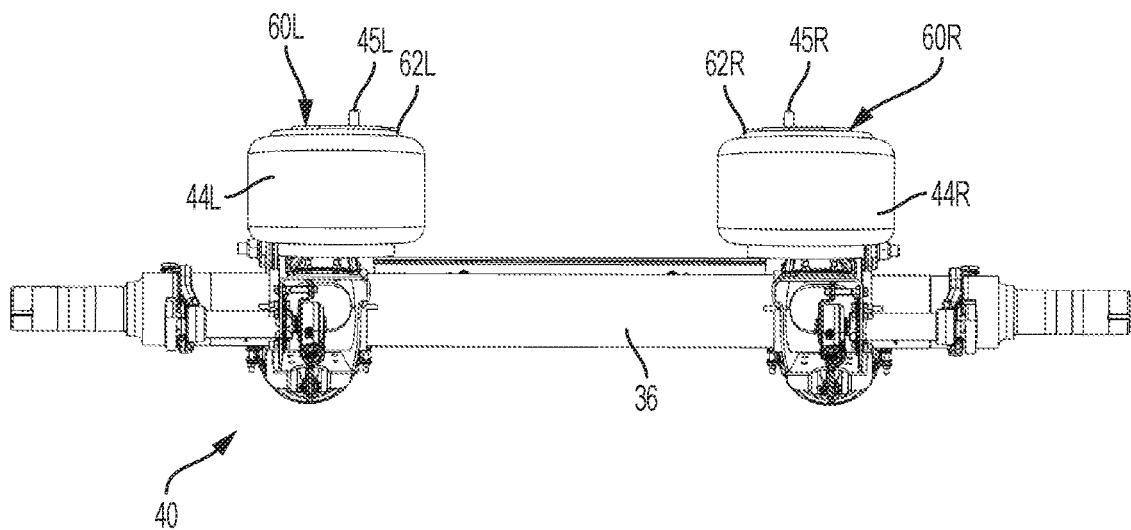
FIG. 7 is a front elevational view of the assembled components of FIG. 6.

When assembled to the suspension assembly 40, as shown in FIGS. 6 and 7, the plates 62L, 62R of the lower front frame members 60L, 60R rest upon the corresponding air bags 44L, 44R of the suspension assembly 40. Also, the vertically-extending locating holes 64L, 64R in the plates 62L, 62R receive vertically-extending locating posts 45L, 45R from the corresponding air bags 44L, 44R. The plates 62L, 62R are free to slide up and down along the locating posts 45L, 45R.

Figure 8:
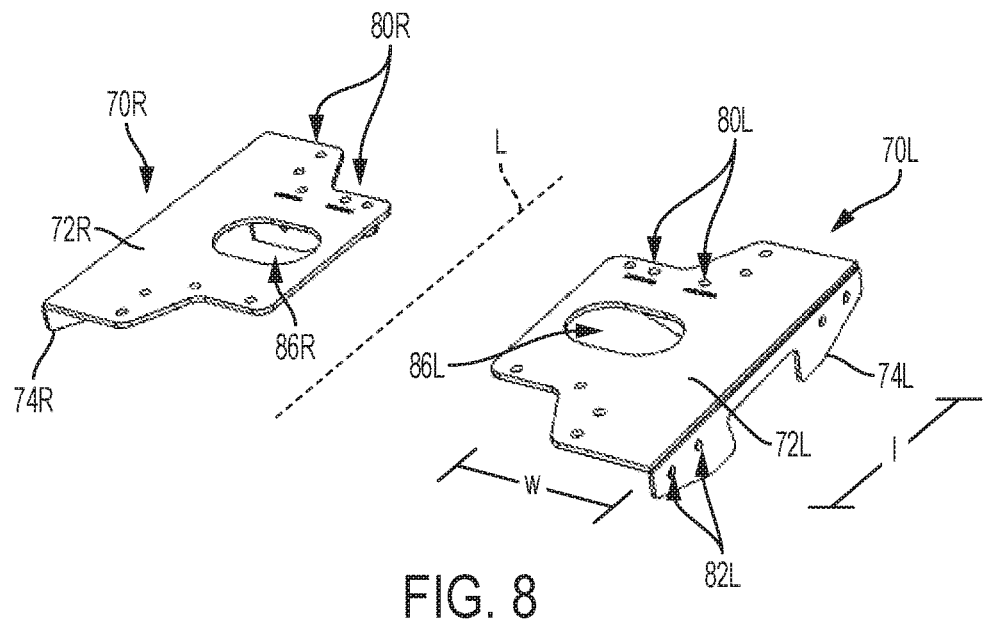
FIG. 8 is a top perspective view of the lower rear frame members of FIG. 4.
Figure 9:
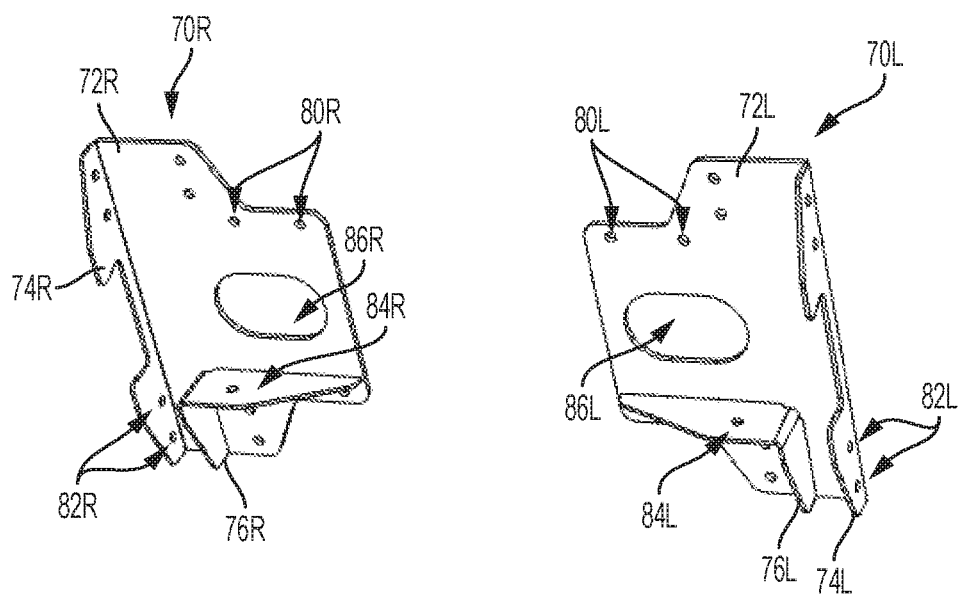
FIG. 9 is a bottom perspective view of the lower rear frame members of FIG. 8.

Next, the lower rear frame members 70L, 70R of the adapter assembly 50 are described with reference to FIGS. 8 and 9. The illustrative lower rear frame members 70L, 70R are mirror images of one another about the longitudinal axis L. Each lower rear frame member 70L, 70R includes a generally T-shaped plate 72L, 72R, a downwardly-extending outer flange 74L, 74R, and a downwardly-extending L-shaped inner flange 76L, 76R. Each lower rear frame member 70L, 70R also includes a first plurality of vertically-extending fastening holes 80L, 80R in plate 72L, 72R, a second plurality of laterally-extending fastening holes 82L, 82R in the outer flange 74L, 74R, and at least a third longitudinally-extending fastening hole 84L, 84R in the inner flange 76L, 76R. Each lower rear frame member 70L, 70R may further include one or more lightening holes 86L, 86R and other holes for receiving various suspension components. In one embodiment, each plate 72L, 72R has a length, l, of approximately 21 to 25 inches and, more particularly, approximately 22.75 inches, and has a width, w, of approximately 13 to 17 inches and, more particularly, approximately 15.25 inches.

Figure 10:
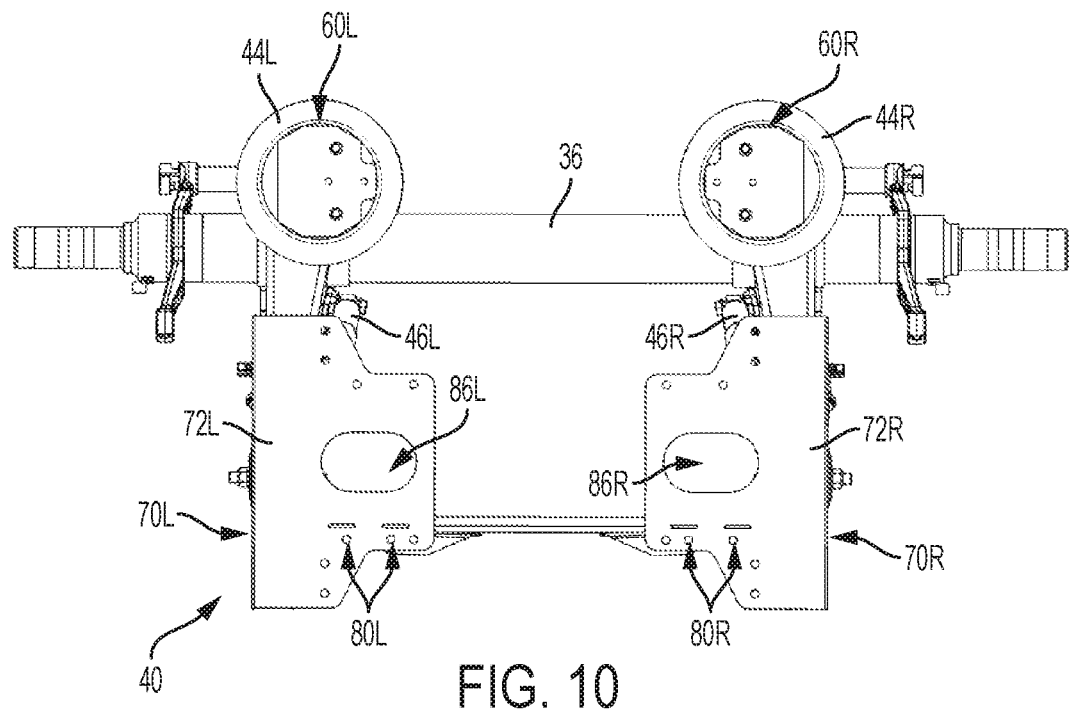
FIG. 10 is a top plan view of the lower front frame members and the lower rear frame members assembled to the suspension assembly.
Figure 11:
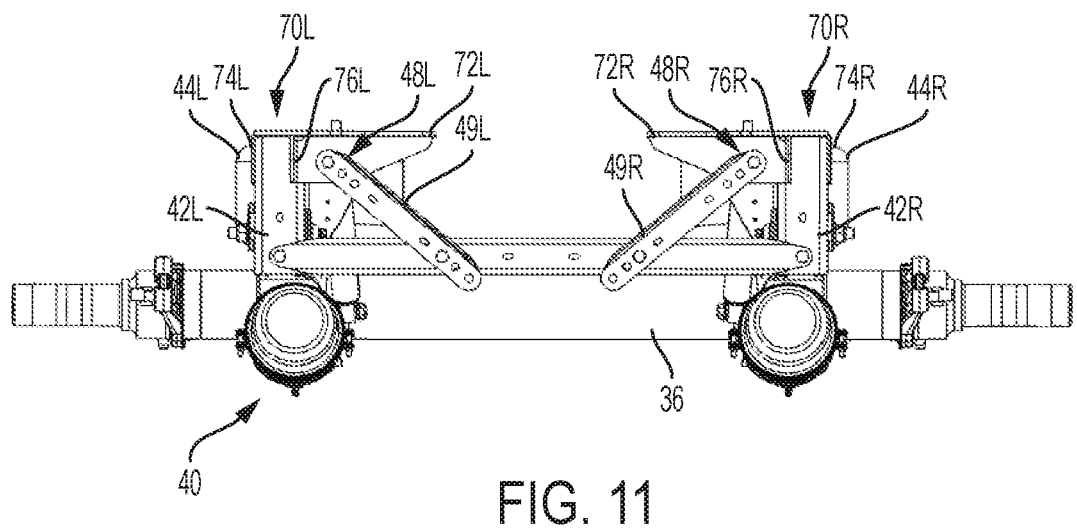
FIG. 11 is a rear elevational view of the assembled components of FIG. 10.

When assembled to the suspension assembly 40, as shown in FIGS. 10 and 11, the plates 72L, 72R of the lower rear frame members 70L, 70R rest upon the corresponding pivoting frame assemblies 42L, 42R of the suspension assembly 40. The downwardly-extending outer flanges 74L, 74R and inner flanges 76L, 76R cooperate to receive the pivoting frame assemblies 42L, 42R therebetween, as shown in FIG. 11. The plates 72L, 72R are removably coupled to the corresponding pivoting frame assemblies 42L, 42R. In the illustrated embodiment of FIG. 11, for example, the plates 72L, 72R are removably coupled to the corresponding pivoting frame assemblies 42L, 42R by inserting fasteners (e.g., bolts) (not shown) longitudinally through the fastening holes 84L, 84R (FIG. 9) in the inner flanges 76L, 76R and through corresponding fastening holes 48L, 48R in brackets 49L, 49R of the pivoting frame assemblies 42L, 42R.

Figure 12:
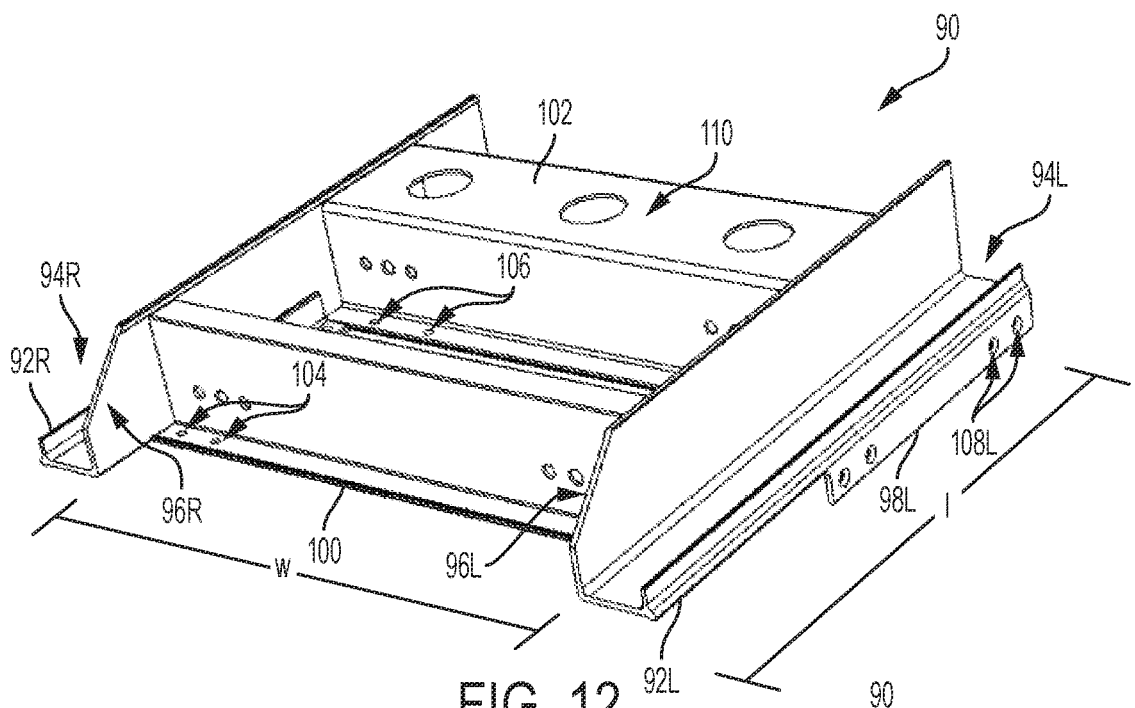
FIG. 12 is a top perspective view of the upper frame member of FIG. 4.
Figure 13:
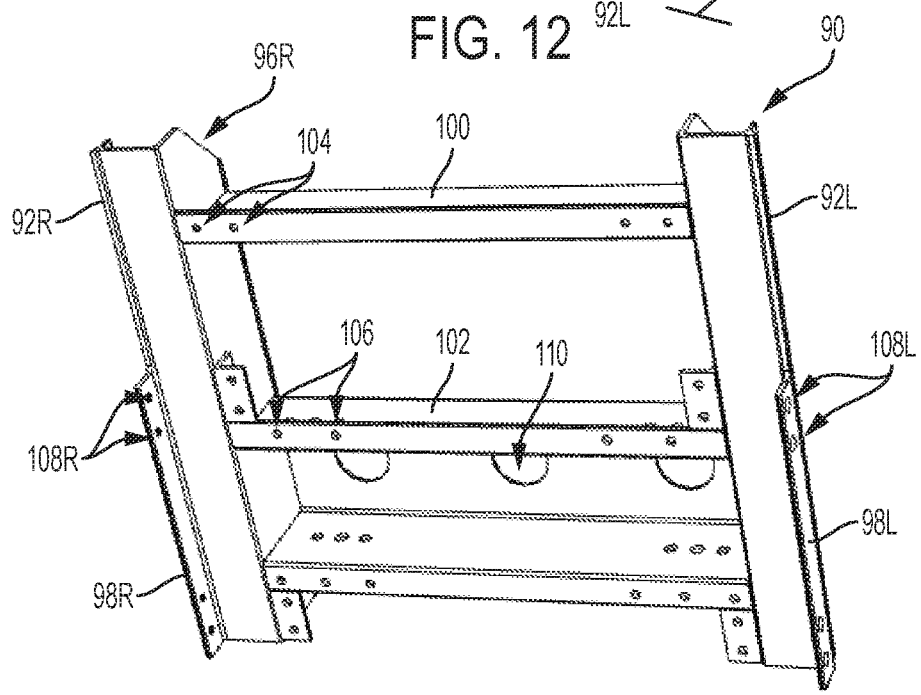
FIG. 13 is a bottom perspective view of the upper frame member of FIG. 12.

Next, the upper frame member 90 of the adapter assembly 50 is described with reference to FIGS. 12 and 13. The upper frame member 90 includes longitudinal arms 92L, 92R, wherein each longitudinal arm 92L, 92R includes an upwardly-facing U-shaped channel 94L, 94R, an upwardly-facing chamfered edge 96L, 96R, and a downwardly-extending outer flange 98L, 98R. The upper frame member 90 also includes a front cross-brace 100 and a rear cross-brace 102 extending between the longitudinal arms 92L, 92R. The upper frame member 90 further includes a first plurality of vertically-extending fastening holes 104 in the front cross-brace 100, a second plurality of vertically-extending fastening holes 106 in the rear cross-brace 102, and a third plurality of laterally-extending fastening holes 108L, 108R in the outer flanges 98L, 98R. The upper frame member 90 may further include one or more lightening holes 110 and other holes for receiving various suspension components. In one embodiment, the upper frame member 90 has a length, l, of approximately 30 to 60 inches and, more particularly, approximately 42 inches, and has a width, w, of approximately 46 to 50 inches and, more particularly, approximately 48 inches.

Figure 14:
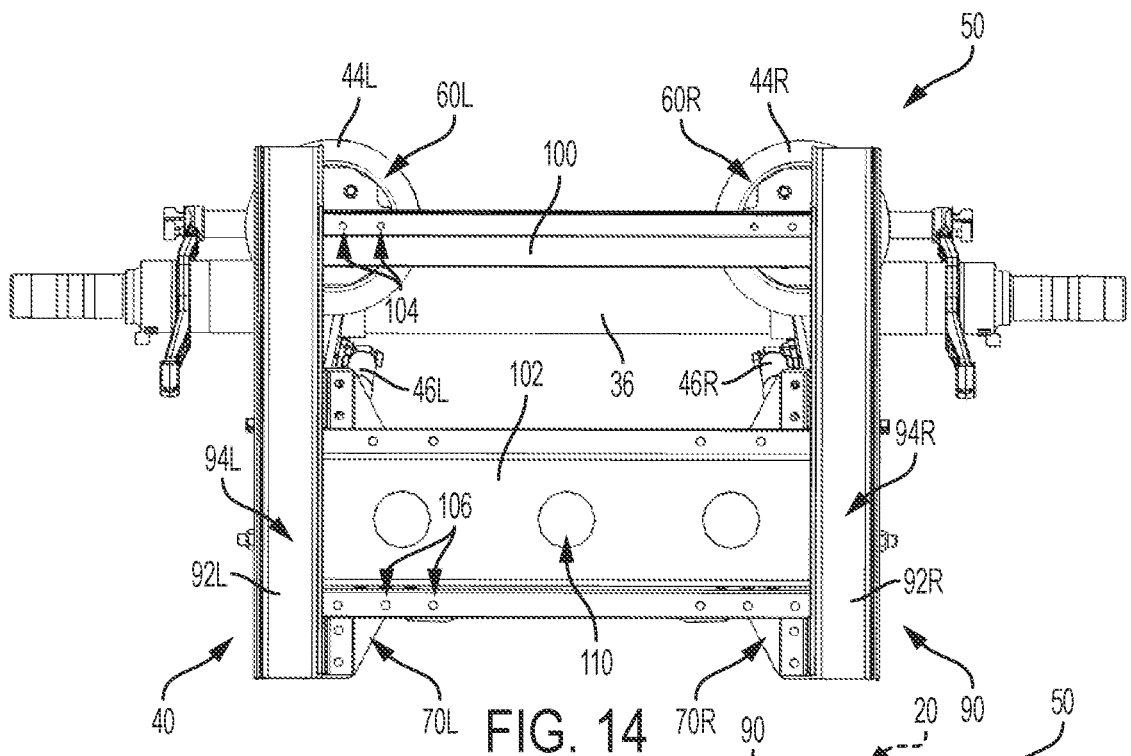
FIG. 14 is a top plan view of the lower front frame members, the lower rear frame members, and the upper frame member assembled to the suspension assembly.
Figure 15:
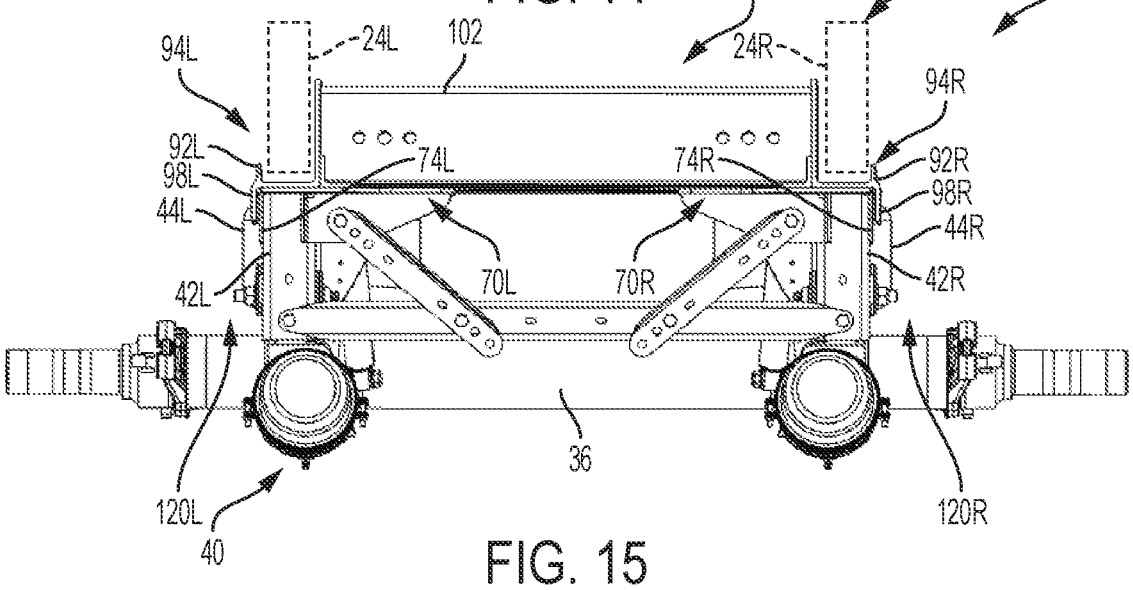
FIG. 15 is a rear elevational view of the assembled components of FIG. 14.

When assembled to the suspension assembly 40, as shown in FIGS. 14 and 15, the longitudinal arms 92L, 92R of the upper frame member 90 rest upon the corresponding lower front frame members 60L, 60R and the corresponding lower rear frame members 70L, 70R. As shown in FIG. 15, the U-shaped channels 94L, 94R in the upper frame member 90 are sized and shaped to receive the longitudinal support beams 24L, 24R of the composite floor assembly 20. The U-shaped channels 94L, 94R in the upper frame member 90 are centered above the pivoting frame assemblies 42L, 42R of the suspension assembly 40 and, therefore, the longitudinal support beams 24L, 24R of the composite floor assembly 20 are also centered above the pivoting frame assemblies 42L, 42R of the suspension assembly 40. This arrangement allows the suspension assembly 40 to support the weight of the floor assembly 20 and any cargo thereon.

The upper frame member 90 is removably coupled to the lower front frame members 60L, 60R. In the illustrated embodiment of FIG. 14, for example, the upper frame member 90 is removably coupled to the lower front frame members 60L, 60R by inserting fasteners (e.g., bolts) (not shown) vertically through the fastening holes 104 in the front cross-brace 100 and through corresponding fastening holes 66L, 66R in the plates 62L, 62R of the lower front frame members 60L, 60R (FIG. 6). The upper frame member 90 is also removably coupled to the lower rear frame members 70L, 70R. In the illustrated embodiment of FIG. 14, for example, the upper frame member 90 is removably coupled to the lower rear frame members 70L, 70R by inserting fasteners (e.g., bolts) (not shown) vertically through the fastening holes 106 in the rear cross-brace 102 and through corresponding fastening holes 80L, 80R in the plates 72L, 72R of the lower rear frame members 70L, 70R (FIG. 10). Additionally, the upper frame member 90 is removably coupled to the lower rear frame members 70L, 70R by inserting fasteners (e.g., bolts) (not shown) laterally through the fastening holes 108L, 108R in the outer flanges 98L, 98R of the upper frame member 90 (FIG. 13) and through corresponding fastening holes 82L, 82R in the outer flanges 74L, 74R of the lower rear frame members 70L, 70R (FIG. 9). Advantageously, the outer flanges 98L, 98R of the upper frame member 90 overhang the outer flanges 74L, 74R of the lower rear frame members 70L, 70R in FIG. 15 to accommodate these laterally-extending fasteners outboard of the U-shaped channels 94L, 94R without intruding into the tire clearance areas 120L, 120R.

The upper frame member 90 is permanently coupled to the composite floor assembly 20. More specifically, the longitudinal arms 92L, 92R of the upper frame member 90 are permanently coupled to the longitudinal support beams 24L, 24R of the composite floor assembly 20. According to an exemplary embodiment of the present disclosure, this permanent coupling is achieved by placing a bonding agent (e.g., adhesive) in the U-shaped channels 94L, 94R of the upper frame member 90. The upper frame member 90 may include one or more injection ports (not shown) for injecting or otherwise supplying the adhesive into the U-shaped channels 94L, 94R. In one embodiment, the interfacing surfaces of the longitudinal arms 92L, 92R and/or the longitudinal support beams 24L, 24R may be roughened, scuffed, or otherwise texturized to receive the adhesive. In this arrangement, no fasteners or other coupling devices need to extend into the composite floor assembly 20 and, as a result, the composite floor assembly 20 is not damaged by any mechanical fasteners or their corresponding holes. The structural integrity of the composite floor assembly 20 is maintained without the need to receive mechanical fasteners or their corresponding holes. Therefore, through the combination of permanently coupling the upper frame member 90 of the adapter assembly 50 to the composite floor assembly 20 with adhesive and removably coupling the lower front frame members 60L, 60R and the lower rear frame members 70L, 70R of the adapter assembly 50 to the suspension assembly 40 with mechanical fasteners, the composite floor assembly 20 is not damaged by the assembly of the suspension assembly 40 to the composite floor assembly 20, and the suspension assembly 40 is easily removed from the composite floor assembly 20 when necessary.

The adhesive supplied to the U-shaped channels 94L, 94R for bonding the upper frame member 90 to the composite floor assembly 20 may be a structural adhesive. Structural adhesives may be used for load-bearing applications and, therefore, may be epoxies, acrylics, polyurethanes, cyanoacrylates, anaerobics, phenolics, and/or vinyl acetates with a lap shear strength greater than 1 MPa. Structural adhesives are typically applied to bonding surfaces at a temperature below the glass-transition temperature of the adhesive and subsequently cured over time and/or with heat.

Returning to FIG. 4, the upper frame member 90 may transfer strong forces from the suspension assembly 40 to the composite floor assembly 20 during operation. The chamfered edges 96L, 96R of the upper frame member 90 may help distribute these forces across the composite support beams 24L, 24R, rather than concentrating these forces at a corner point. Also, stiffening ribs 25 on the composite support beams 24L, 24R may be located adjacent to the upper frame member 90 to strengthen the support beams 24L, 24R in these locations. In the illustrated embodiment of FIG. 4, for example, first relatively long stiffening rib 25A is located just in front of the upper frame member 90, a second relatively short stiffening rib 25B is located just above the upper frame member 90, and a third relatively long stiffening rib 25C is located just behind the upper frame member 90.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo vehicle comprising:
a composite floor assembly configured to support cargo;
at least one wheel assembly configured to transport the cargo on the composite floor assembly;
a suspension assembly associated with the at least one wheel assembly, wherein the suspension assembly comprises a left air bag and a right air bag; and
an intermediate adapter assembly permanently coupled to the composite floor assembly and removably coupled to the suspension assembly, wherein the adapter assembly comprises a left front frame member that rests upon the left air bag of the suspension assembly and a right front frame member that rests upon the right air bag of the suspension assembly.

2. A cargo vehicle comprising:
a composite floor assembly configured to support cargo;
at least one wheel assembly configured to transport the cargo on the composite floor assembly;
a suspension assembly associated with the at least one wheel assembly, wherein the suspension assembly comprises a left pivoting frame assembly and a right pivoting frame assembly; and
an intermediate adapter assembly permanently coupled to the composite floor assembly and removably coupled to the suspension assembly, wherein the adapter assembly comprises a left rear frame member that rests upon the left pivoting frame assembly of the suspension assembly and a right rear frame member that rests upon the right pivoting frame assembly of the suspension assembly.

3. A cargo vehicle comprising:
a composite floor assembly configured to support cargo;
at least one wheel assembly configured to transport the cargo on the composite floor assembly;
a suspension assembly associated with the at least one wheel assembly; and
an intermediate adapter assembly permanently coupled to the composite floor assembly and removably coupled to the suspension assembly, wherein the adapter assembly comprises:
an upper frame member that is permanently coupled to the composite floor assembly; and
at least one lower frame member that is removably coupled to the suspension assembly.

4. The cargo vehicle of claim 3, wherein the upper frame member is removably coupled to the at least one lower frame member.

5. The cargo vehicle of claim 4, wherein:
the upper frame member includes a first flange; and
the at least one lower frame member includes a second flange;
wherein the first flange of the upper frame member is removably coupled to the second flange of the at least one lower frame member.

6. The cargo vehicle of claim 5, wherein the first and second flanges extend vertically to receive fasteners horizontally.

7. The cargo vehicle of claim 5, wherein:
the composite floor assembly comprises a longitudinal support beam; and
the first flange of the upper frame member is located outboard of the longitudinal support beam.

8. A cargo vehicle comprising:
a composite floor assembly configured to support cargo, the composite floor assembly comprising a left longitudinal support beam and a right longitudinal support beam;
at least one wheel assembly configured to transport the cargo on the composite floor assembly;
a suspension assembly associated with the at least one wheel assembly; and
an adapter assembly positioned between the composite floor assembly and the suspension assembly, the adapter assembly defining a left channel that receives the left longitudinal support beam of the composite floor assembly and a right channel that receives the right longitudinal support beam of the composite floor assembly.

9. The cargo vehicle of claim 8, wherein the suspension assembly comprises:
a left pivoting frame assembly centered beneath the left longitudinal support beam of the composite floor assembly and the left channel of the adapter assembly; and
a right pivoting frame assembly centered beneath the right longitudinal support beam of the composite floor assembly and the right channel of the adapter assembly.

10. The cargo vehicle of claim 8, wherein the adapter assembly comprises:
an upper left flange that extends vertically upward over an outer left side of the left longitudinal support beam;

an upper right flange that extends vertically upward over an outer right side of the right longitudinal support beam;

a lower left flange that extends vertically downward over an outer left side of the suspension assembly; and a lower right flange that extends vertically downward over an outer right side of the suspension assembly.

11. The cargo vehicle of claim 8, wherein the adapter assembly comprises:

at least one left chamfered edge in contact with the left longitudinal support beam; and at least one right chamfered edge in contact with the right longitudinal support beam.

12. The cargo vehicle of claim 8, wherein each of the left and right longitudinal support beams comprises a plurality of stiffening ribs adjacent to the adapter assembly.

13. A method of joining a suspension assembly of a cargo vehicle to a composite floor assembly of the cargo vehicle, the composite floor assembly having a left longitudinal support beam and a right longitudinal support beam, the method comprising the steps of:

providing an intermediate adapter assembly that defines a left channel and a right channel;

positioning the left longitudinal support beam of the composite floor assembly in the left channel of the intermediate adapter assembly and the right longitudinal support beam of the composite floor assembly in the right channel of the intermediate adapter assembly;

permanently coupling the adapter assembly to the composite floor assembly; and removably coupling the adapter assembly to the suspension assembly.

14. The method of claim 13, wherein the permanently coupling step comprises adhering the adapter assembly to the composite floor assembly by placing an adhesive in the left and right channels.

15. The method of claim 13, wherein the permanently coupling step is performed without forming holes in the composite floor assembly.

16. The method of claim 13, wherein the removably coupling step comprises mechanically fastening the adapter assembly to the suspension assembly.

\* \* \* \* \*